United States Patent [19]

Yoshine et al.

[11] Patent Number: 4,503,546
[45] Date of Patent: Mar. 5, 1985

[54] PULSE SIGNAL TRANSMISSION SYSTEM

[75] Inventors: Hiroki Yoshine, Machida; Yoshitaka Takasaki, Tokorozawa; Yasushi Takahashi, Hachioji; Mitsuo Yamada, Ohme; Katsuyuki Nagano, Nishitama, all of Japan

[73] Assignee: Hitachi, Ltd., Tokyo, Japan

[21] Appl. No.: 471,128

[22] Filed: Mar. 1, 1983

[30] Foreign Application Priority Data

Mar. 19, 1982 [JP] Japan ............................ 57-42763

[51] Int. Cl.³ ............................................ H03K 13/02
[52] U.S. Cl. ........................................ 375/37; 375/94; 340/347 DD
[58] Field of Search ............... 375/17, 18, 19, 20, 375/37, 49, 95, 28, 94; 340/347 DD; 455/608; 360/40, 41, 42, 43, 48

[56] References Cited

U.S. PATENT DOCUMENTS

| 3,665,103 | 5/1972 | Watkins | 375/49 |
| 3,953,673 | 4/1976 | Dorward | 375/19 |
| 4,071,692 | 1/1978 | Weir et al. | 375/20 |
| 4,220,816 | 9/1980 | Howells et al. | 370/24 |
| 4,267,595 | 5/1981 | Hernandez | 375/95 |

OTHER PUBLICATIONS

Takasaki et al., "Line Coding Plans for Fiber Optic Communication Systems", Jun. 16-18, 1975, pp. 32-2-0-32-24, Conference Record, vol. II, International Conference on Comm.
Takasak et al., "Line Coding Plan for Fiber Optic Communication System", Proceeding of IEEE, Jul. 1975, pp. 1081-1082.

Primary Examiner—Robert L. Griffin
Assistant Examiner—Stephen Chin
Attorney, Agent, or Firm—Antonelli, Terry & Wands

[57] ABSTRACT

A two-level alternate mark inversion signal transmission system wherein binary pulses of "1" and "0" levels are converted into a pulse signal in which one coded information value has its polarity inverted at a period T and the other has its polarity reversed at a period T/2, and the converted signal is transmitted. In order to facilitate an automatic gain control operation and the proper and reliable extraction of a timing signal on the receiving side of the system even when the zero binary pulses have successively arisen in the signal processed on the transmitting side, the alternate mark inversion signal is converted into a specified code (zero substitution) signal when the zero binary pulses have succeeded one another for a predetermined number of times, while on the receiving side, a received signal is subjected to duobinary shaping, whereupon the zero substitution part is detected for removal by utilizing the rules of the zero substitution process and the alternate mark inversion signal.

31 Claims, 10 Drawing Figures

PULSE SIGNAL TRANSMISSION SYSTEM

FIELD OF THE INVENTION

The present invention relates to a pulse signal transmission system. More particularly, it relates to a pulse signal transmission system wherein a binary signal of "1" and "0" levels is converted into a coded pulse signal, in which one code has its polarity inverted at a fixed period T and the other code has its polarity inverted at a fixed period T/2, before the pulse signal is transmitted. Especially, it relates to the arrangements of signal converter circuits in transmitting and receiving systems.

BACKGROUND OF THE INVENTION

In the case of transmitting a pulse signal, it is desirable in the use of a transmission line as well as associated circuit devices that the transmission pulse signal is D.C. balanced and that timing information is easy to extract from the signal at the receiving end. Further, in the use of optical communication circuits and the like, two-level transmission pulses are desirable from the viewpoint of the nonlinearity of the light source.

As a pulse signal transmission system fulfilling these conditions, it has been known to use a pulse signal in which one of the original binary information levels "0" and "1" is encoded into a pulse "11" or "00" and the other is encoded into a pulse "01" or "10"; in other words, one binary information level is converted into alternate polarities at a period T and the other is provided at a period T/2. Hereinbelow, such a pulse signal shall be referred to as a "two-level AMI (Alternate Mark Inversion) signal". As compared with conventional three-level bipolar codes, the two-level AMI codes have one-half of the transmission pulse period, namely, two times the timing frequency, and have twice the transmission speed (bandwidth) required of a transmitter and receiver. It is therefore unfavorable when the clock rate of the original information signal is high (for example, 100 Mb/s or above) since this requires extremely high speed circuitry.

As a measure for eliminating this problem, the two-level AMI signal is subjected to a duo-binary shaping in a receiving circuit portion of the system. This processing is performed with a low-pass filter whose frequency characteristic is cosine-shaped. Equivalently, the filter has the effect of adding the two-level AMI signal and a signal obtained by delaying this two-level AMI signal by ½T. A waveform is obtained after the processing which takes the form of a three-level bipolar signal. Since the duo-binary shaped signal arises at the same clock rate T as that of the original information signal, it has the advantage that the transmission band beciomes one-half of that in the case of transmitting the unmodified two-level AMI signal. However, it has the disadvantage that, when information "0's" succeed one another in the original information, a stable timing signal cannot be effectively extracted at the receiving end.

In the case of the three-level AMI signal, when such information "0's" succeed one another, a method (hereinbelow, called the "zero substitution method") is sometimes relied on wherein the successive "0's" are replaced in the transmission by a waveform pattern which does not conform with a specified AMI law, and on the receiving side, the waveform pattern is utilized as timing information. In addition, the part of the signal replaced by the specified waveform pattern is reconverted into the succession of "0's" provided by the original information. This method, however, cannot be applied to the case of a two-level AMI signal. More specifically, even when the zero succession part of the signal is replaced on the transmitting side by a special pattern which does not conform with the code conversion rules of the two-level AMI signal, undefined pulses arise in the duo-binary shaped three-level AMI signal. It is therefore difficult to properly identify the zero substitution part and to properly convert this part into the zero succession signal provided in the original information.

SUMMARY OF THE INVENTION

It is accordingly an object of the present invention to provide a pulse transmission system using a two-level AMI signal, wherein even when a lengthy succession of "0's" arises in an original information signal, the receiving circuit portion of the system can properly extract a timing signal and can precisely regenerate the original information pulses without widening the transmission band.

In order to accomplish the foregoing object, according to the present invention, there is provided a code transmission system having a transmitting circuit portion which converts two-level original information pulses to-be-transmitted into two-level AMI codes and which delivers the codes to a transmission line, and a receiving circuit portion which receives the signal sent by the transmission line and which decodes the original information after duo-binary shaping. The invention is characterized in that a signal converter in the transmitting circuit portion is constructed so as to include a circuit by which, when original information "0's" (or "1's") have succeeded one another over, at least, a fixed length, the successive part of the fixed length is replaced by a recognizable pulse train including two-level AMI codes of level "1" (or "0") in-phase with or anti-phase to the original information, and that a circuit is provided at the receiving end for detecting the substituted pulse train in the form of a circuit which discriminates the pulse train on the basis of the code pattern (including undefined pulses) regenerated from the duo-binary shaped signal.

In the above-described construction, the expressions "in-phase" and "anti-phase" shall be construed as follows. As will be state later, the polarities of pulses are inverted at respective time slots in the two-level AMI signal. Herein, the code whose polarity changes at the boundary of the time slots is "in-phase", whereas, the code whose polarity remains unchanged at the boundary of the time slots is "anti-phase". According to the above-described features, since an in-phase two-level AMI code exists in the zero succession part of the signal, a pulse in-phase with a timing signal is generated also in the duo-binary shaped signal. In addition, since an anti-phase two-level AMI code is also included in the zero succession part of the signal, the property of the normal duo-binary shaped three-level AMI signal in which the polarities are alternately inverted is removed. Therefore, it can readily determined from an identification of these features in the signal that a substitution of the pulse train for the "0" succession has been effected in the received portion of the signal.

The above-mentioned an other object and features of this invention will become more apparent by reference to the following description taken in conjunction with the accompanying drawings.

DETAILED DESCRIPTION OF THE PREFERRED EMBODIMENTS

Figure 1:
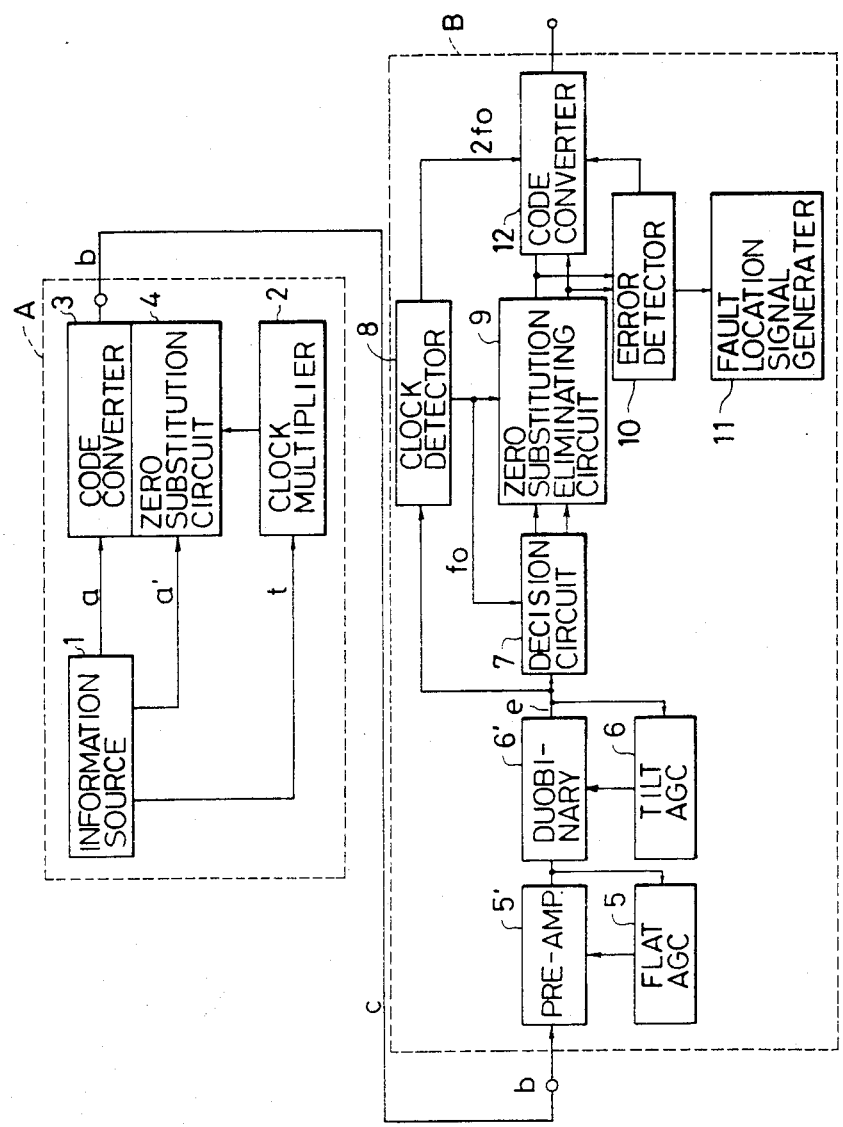
FIG. 1 is a schematic block diagram showing the general arrangement of an embodiment of a pulse signal transmission system according to the present invention.

FIG. 1 is a block diagram showing the general arrangement of an embodiment of a pulse signal transmission system according to the present invention. Referring to the figure, in a transmitting circuit portion A, a pulse signal a composed of ordinary binary signals of "1" and "0" levels and having a fixed period T is generated by an information signal source 1 and is converted into a two-level AMI signal b by a code converter 3. When, in the information signal, information of level "0" succeeds itself at least a predetermined number of times, a detection signal a' is generated, and it operates a zero substitution circuit 4 so as to execute a code conversion different from the one employed in the usual case. A clock multiplier 2 multiplies the clock (timing signal t used for the original signal, and the multiplied signal is applied to the code converter 3 as well as to the zero substitution circuit 4.

In a receiving circuit portion B, the signal b received via transmission line c is amplified into a signal of fixed amplitude by a preamplifier 5' which is subjected to control from a flat automatic gain control (AGC) circuit 5, whereupon the amplified signal is converted into a duo-binary shaped signal e by a conventional duo-binary shaping circuit 6'. In this case, the distortion of the signal attributed to the frequency characteristic of the transmission line c may be compensated by a tilt automatic gain control (AGC) circuit 6. The duo-binary shaping circuit is constructed in the well-known manner so as to also include the function of a roll-off filter (a low-pass filter for removing a high frequency component).

In accordance with the invention, a decision circuit 7 compares the duo-binary shaped signal with a threshold value so as to individually deliver plus and minus pulses to a zero substitution eliminating circuit 9. The zero substitution eliminating circuit 9, which removes the regenerated signal resulting from the zero substitution, applies its output on the one hand to a code converter 12 and on the other hand to an error detector 10. The detected result of a code error by the error detector 10 is applied to the code converter 12 so as to modify the decoded signal. Another part of the detected result from the error detector 10 is sometimes transmitted to a terminal station through a fault location signal generator 11 in order to indicate that an error has occurred. Further, in the case of using the receiving circuit portion B as a repeater, the detected result is converted by the code converter 12 into a 2-level AMI code, which is delivered to the next transmission line.

A clock detector 8 generates clock signals as timing signals synchronous with the transmitted signal in such a way that a resonator having a resonance frequency equal to the bit rate is excited by the duo-binary signal e. The resulting clock signals are applied to the decision circuit 7, the zero substitution eliminating circuit 9 and the code converter 12.

In the above-described arrangement, the characterizing features of the present invention are principally concerned with the zero substitution circuit 4, the decision circuit 7 and the zero substitution eliminating circuit 9. Since the other circuit portions are well known, a detailed description thereof shall be omitted herein.

Figure 2:
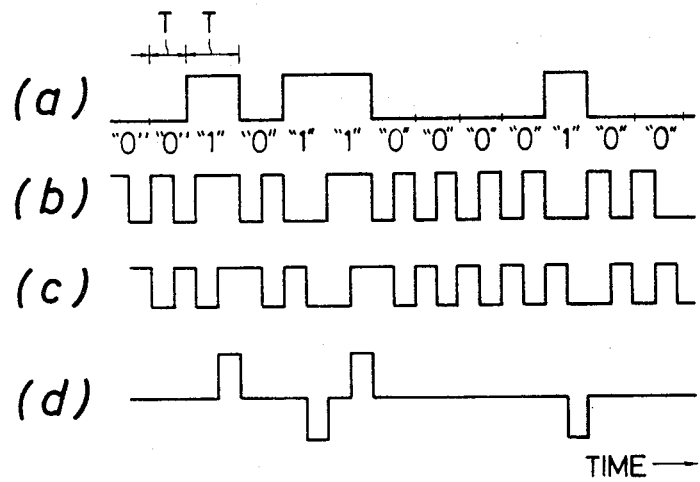
FIG. 2 is a waveform diagram for explaining a two-level AMI signal and a duo-binary shaped signal.

FIG. 2 is a waveform diagram for explaining the 2-level AMI code and the duo-binary shaping operation. In the figure, the line (a) indicates the original information signal which consists of the binary signals of "1" and "0" levels and which has the fixed period T (clock rate). The line (b) indicates the 2-level AMI signal into which the signal a has been converted by the code converter 3. As can be seen, the level "1" of the original information signal is represented by a waveform in which the polarity (level) is maintained during the entire time slot and is changed only at the boundary of the time slots, while the level "0" of the original information signal is represented by a waveform which has the polarity inverted every one-half of a time slot ($\frac{1}{2}T$).

Line (d) in FIG. 2 indicates the duo-binary shaped signal, which has a waveform similar to one resulting from the addition of the signal (b) and a signal (c) obtained by delaying the signal (b) by T/2 (for example, the addition wherein the level "0" is assumed to be $-0.5$ and the level "1" is assumed to be $+0.5$). As apparent from line (d), the duo-binary shaped signal has pulses generated in the places of the original information level "1" and with alternate polarities, similar to the so-called bipolar code. Accordingly, when a signal obtained through the full-wave rectification of the signal (d) is used for exciting a resonator having a resonance frequency 1/T, the timing (clock) signal can be readily and easily extracted. However, as can be seen, when "0's" appear in succession in a relatively-lengthy repetition in the original information, no pulse appears in the duo-binary shaped signal. In prior art pulse transmission systems, therefore, a situation occurs where the timing signal cannot be obtained from the received signal for a significant period, resulting in loss of synchronization at the receiving end.

Figure 3:
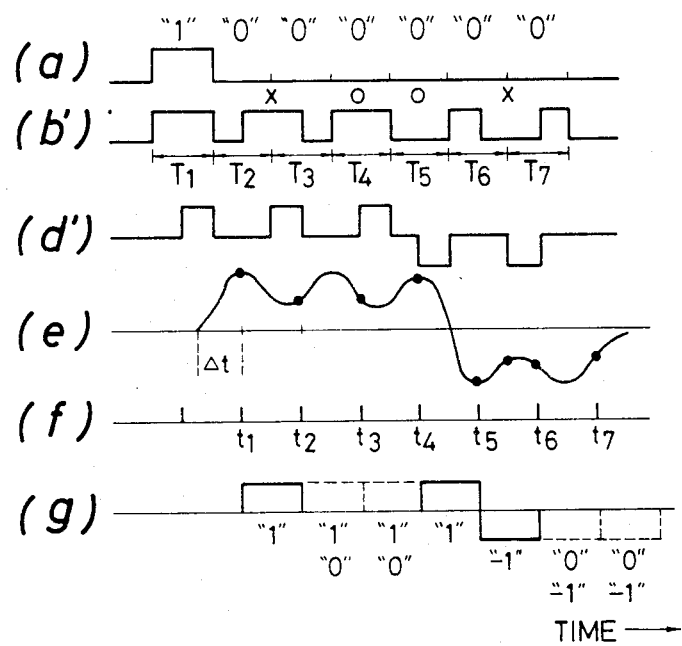
FIGS. 3 and 9 are waveform diagrams for explaining the principles of operation in various embodiments of the present invention.

FIG. 3 is a waveform diagram for explaining the principle of the present invention. In the figure, line (a) indicates the original information signal, in which the zero substitution operation is conducted when six "0's" in succession follow a level "1". A signal (b') does not conform with the normal 2-level AMI signal conversion rules. In particular, polarities are not changed at the boundary between the second and third time slots $T_2$, $T_3$ and at the boundary between the sixth and seventh time slots $T_6$, $T_7$ indicated by marks x. In addition, in each of the fourth and fifth time slots $T_4$, $T_5$ indicated by marks o, the same polarity is maintained over the length of the time slot as in the case of an information level "1" in spite of the fact that the original information is at level "0". The part of the two-level AMI signal corresponding to the succession of a certain number of "0's", which is converted into two-level signals not conforming with the normal rules in this manner, shall be called the "zero substitution" portion of the signal. In addition, pulses of widths T (including plus and minus pulses) at the mark x and at the mark o shall be respectively called the "pulses in-phase with and anti-phase to" the original information. Further, the conversion effected at the mark x shall be called a "violation".

Line (d') of FIG. 3 indicates the duo-binary shaped signal derived from the signal (b'). That is, the signal (d') is obtained by adding the signal (b') and a signal representing the signal (b') delayed by T/2. Actually, the duo-binary shaped signal becomes a signal with a dull waveform and with a time delay $\Delta T$ as shown at (e), on account of transmission characteristics. This signal is sampled at timings (period T) shown at (f), compared with a threshold value, and wave-shaped in the decision circuit 7. Then, a waveform as shown at (g) is obtained.

Accordingly, the duo-binary shaped signal (e) produces pulses in the part where the original information "0's" succeed one another. Therefore, the levels of the input signal can be detected and used as a control signal for the AGC operation. Further, since pulses having a peak value develop at the sampling points $t_4$ and $t_5$, the timing signal is easily extracted. That is, when the resonator is excited by the pulses having the peaks at $t_4$ and $t_5$, it is effectively excited.

In the waveform (e), however, the pulses at the positions of the violation become anti-phase and act to cancel the timing signal because of the peak values lying midway between the sampling points. Since, however, the in-phase pulses arising at $t_4$ and $t_5$ are adjacent to each other, they have the effect of emphasizing the timing component, so that the timing signal is not lost in spite of equal numbers of the in-phase and anti-phase pulses. In addition, the positions of the regenerated waveform (g) at the points of time $t_2$ and $t_3$ are undefined as to whether they are "0" or "+1". Also, the positions of the regenerated waveform at the points of time $t_6$ and $t_7$ are undefined as to whether they are "0" or "−1". Such undefined parts are indicated by dotted lines in FIG. 3.

The aforementioned pulses generated by the zero substitution operation are unnecessary as information, and they must be discriminated and removed on the receiving side. In accordance with the present invention, the zero substitution part of the signal is identified and removed by utilizing the properties of the regenerated waveform (g) and the two-level AMI signal. In the case of FIG. 3, when the undefined pulses to become "0" or "+1" are denoted by $\emptyset_+$ and the undefined pulses to become "0" or "−1" are denoted by $\emptyset_-$, the signal comprising the succession of six "0's" becomes "$\emptyset_+$, $\emptyset_+$, 1, −1, $\emptyset_-$, $\emptyset_-$". The presence of the zero substitution signal portion is predicted from this signal pattern. However, there is the possibility that the signal part conforms with the AMI law (for example, "0, 0, 1, −1, 0, 0" at $\emptyset_+=\emptyset_-=0$). In order to distinguish this condition, the invention utilizes the property of the duo-binary shaped signal of the two-level AMI signal, that is, the property that "+1" and "−1" arise alternately. In the case of FIG. 3, "1" exists before the succession of "0's". The signal part can therefore be identified as the regenerated signal based on the zero substitution operation, because $\emptyset_+$ cannot become −1 in "1, $\emptyset_+$, $\emptyset_+$, 1, −1, $\emptyset_-$, $\emptyset_-$". When the part "$\emptyset_+$, $\emptyset_+$, +1, −1, $\emptyset_-$, $\emptyset_-$" is converted into "0, 0, 0, 0, 0, 0" the removal of the zero substitution part of the signal is realized.

Although the above description has referred to the example wherein zero substitution is executed when six "0's" succeed one another in the original information signal, the present invention is not restricted to that example, but is also applicable to cases where zero substitution is performed for a succession of seven or more "0's", as indicated in an embodiment to be described later. In those cases, the zero substitution part of the signal can be identified without considering the regenerated signal of the preceding original information of level "1", as will be described later.

Figure 4:
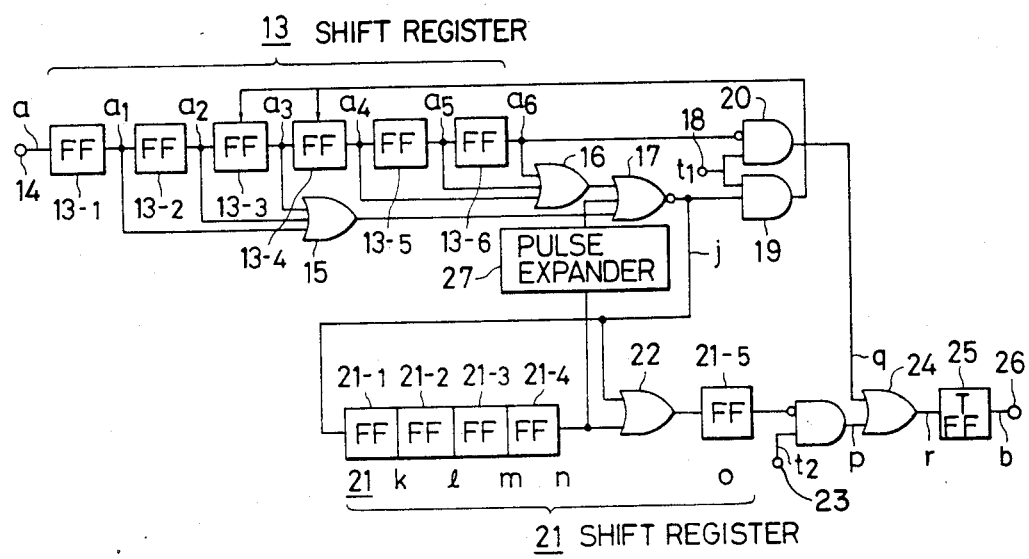
FIGS. 4 and 7 are schematic circuit diagrams each showing the arrangement of an embodiment of a transmitting circuit portion which is provided in the pulse signal transmission system according to the present invention.
Figure 5:
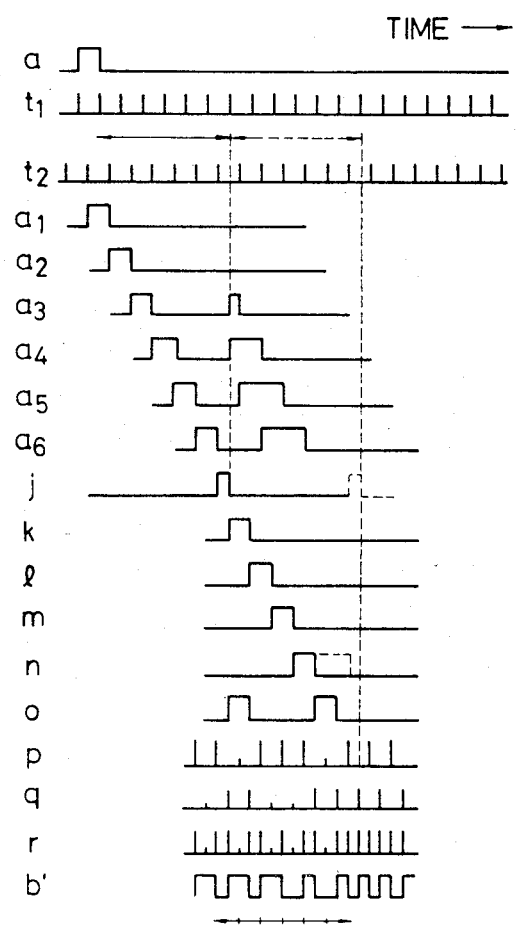
FIGS. 5 and 10 are time charts for explaining the operations of the circuits of FIG. 4 and FIG. 7, respectively.

FIG. 4 is a diagram showing the circuit arrangement of an embodiment of the transmitting circuit portion A in FIG. 1, while FIG. 5 is a time chart for explaining the operation of this embodiment. The zero substitution operation in the present embodiment for the succession of six "0's" is executed in conformity with the rules described in conjunction with FIG. 3. In order to facilitate the explanation of the operation of this circuit, the original information signal a is assumed to be a pulse signal wherein the first valve is "1" succeeded by a plurality of six "0's".

Referring to FIGS. 4 and 5, the signal a is applied to the input terminal 14 of a shift register 13 in which flip-flop circuits are connected in six stages (13-1 to 13-6) and which is operated by a clock signal $t_2$ having a period T. With the lapse of time, the output waveforms of the respective stages become as shown at $a_1-a_6$ in FIG. 5. The succession of six "0's" in the original information can be detected by obtaining the logical sum (OR) of the outputs of the respective stages of the shift register 13. More specifically, the outputs of OR gates 15 and 16 are applied to a NOR gate 17, so that the output j of the NOR gate 17 becomes "1" when six "0's" have appeared in succession in the original information signal.

When, after the generation of the output signal j from the NOR gate 17, the pulse of a clock signal $t_1$ (having a period T and shifted by T/2 with respect to the clock signal $t_2$) which is applied to an input terminal 18 is received at the input of AND gate 19 along with the output of NOR gate 17, the third and fourth stages of flip-flops 13-3 and 13-4 of the shift register 13 are set at "1" from the output of AND gate 19. As will be described later, this operation is intended to generate two in-phase pulses ("+1" and "−1") at this point of time (refer to FIG. 3). Simultaneously therewith, "1" is applied from the output of NOR gate 17 to the first stage 21-1 and fifth stage 21-5 of a shift register 21, which is constructed of five stages of flip-flop circuits 21-1 to 21-5, and in which the logical sum (OR) between the output of the fourth stage and that of the NOR gate 17 is applied to the input of the fifth stage through an OR gate 22. This operation is intended to generate two anti-phase pulses ("+1" and "−1") at this point of time (refer to FIG. 3).

Letters k, l, m, n and o in FIG. 5 show the output waveforms of the respective stages of the shift register 21. The clock $t_1$ of an AND gate 20 is inhibited by the waveform $a_6$, to obtain a train of pulses q (thus, in-phase pulses are obtained as stated below). In addition, when the output o of the fifth stage 21-5 of the register 21 is used to inhibit the clock pulse $t_2$ to be impressed on an input terminal 23, a train of pulses p is obtained (thus, anti-phase pulses can be obtained). The trains of pulses p and q are combined by an OR gate 24 into a train of pulses r, which is applied to a T-type flip-flop 25 as a trigger signal. Accordingly, the zero-substituted two-level AMI signal b' shown in FIG. 3 is provided from the output terminal 26 of the T-type flip-flop 25.

A pulse expander 27 in FIG. 4 expands the output of the fourth stage of the shift register 21 as indicated by a dotted line in the waveform n of FIG. 5. This serves for securing the last point of time of the 6-bit violation in order to prevent the next pulse j for zero succession detection (a part indicated by a dotted line) from arising earlier.

Figure 6:
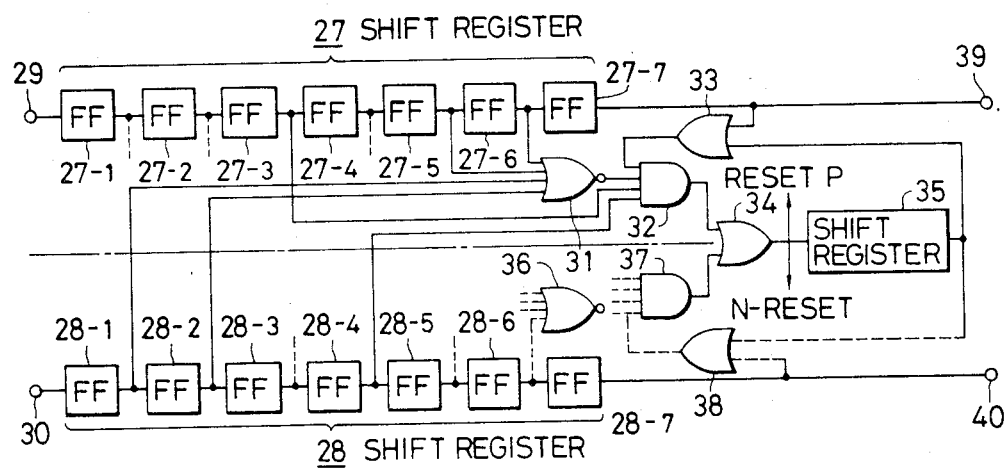
FIGS. 6 and 8 are diagrams each showing an embodiment of a zero substitution eliminating circuit in a receiving circuit portion in the pulse signal transmission system according to the present invention.

FIG. 6 is a circuit diagram showing the arrangement of an embodiment of the zero substitution eliminating circuit 9 in the receiving circuit portion of the system. It is a circuit corresponding to a case where the two-level AMI signal s produced by the embodiment of FIG. 4 has been received as an input signal.

As shown at d' in FIG. 3, the duo-binary shaped signal is a pulse train having the three levels "+1", "0" and "−1". In order to handle the signal by means of logic circuitry for processing two-level signals, this three-level signal is divided into a first pulse train (hereinbelow, called the "P pulse train") wherein only the pulses "+1" in the signal are denoted as "1" and the others (of "0" and "−1") are denoted as "0", and a second pulse train (hereinbelow, called the "N pulse train") wherein only the pulses of "−1" in the signal e are denoted as "1" and the others (of "0" and "+1") are denoted as "0". The division is effected by the decision circuit 7 in FIG. 1. The P pulse train and the N pulse train are respectively applied to the input terminals 29 and 30 of shift registers 27 and 28.

In the case where the duo-binary shaped signal is the signal shown at e in FIG. 3, the regenerated pulse train of the zero substitution part of the signal becomes "$\emptyset_+$, $\emptyset_+$, 1, −1, $\emptyset_-$, $\emptyset_-$" as stated before. In a case where the zero substitution part of the signal has been received in the first to sixth stages of the shift register 27 or 28, $\emptyset_+$ is either "+1" or "0", and $\emptyset_-$ is either "−1" or "0". Therefore, regarding the N pulse train, the first, second and third stages of the shift register 29 become "0" necessarily, and the fourth stage becomes "1" necessarily. Regarding the P pulse train, the third stage becomes "1" necessarily, and the fourth, fifth and sixth stages becomes "0" necessarily.

The pulse train "$\emptyset_+$, $\emptyset_+$, 1, −1, $\emptyset_-$, $\emptyset_-$" can accordingly be identified as a signal based on the zero substitution process, by logic processing as stated below. The logical sum (OR) of the outputs of the fifth and sixth stages of flip-flop circuits 27-5 and 27-6 of the shift register 27 and of the first and second stages of flip-flop circuits 28-1 and 28-2 of the shift register 28, totalling four outputs is obtained. When these outputs are "0", there is the possibility that $\emptyset_+$ and $\emptyset_-$ based on a violation have arisen. A NOR gate 31 accordingly provides "1" at its output with the above logical sum inverted, in correspondence with the violation part. This signal is used as an anti-phase pulse detection signal, and "1" indicates the possibility of the occurrence of $\emptyset_+$ and $\emptyset_-$. On the other hand, the logical product (AND) between the output of the third stage of the flip-flop circuit 27-3 of the shift register 27 and of the fourth stage of flip-flop circuit 28-4 of the shift register 28 is obtained. When it is "1", there is the possibility that the in-phase pulses "1" and "−1" have arisen in the violation. This signal is used as an in-phase pulse detection signal.

In the case where both the in-phase pulse detection signal and the anti-phase pulse detection signal are "1", the possibility of the occurrence of the violation is high, but the original information signal might include the same pattern. In order to discriminate this situation, therefore, it is determined whether the preceding pulse is "1" or whether the zero substitution process has already begun and been removed. In order to determine whether the preceding pulse corresponds to the original information "1", the output of the seventh stage 27-7 of the shift register 27 may be checked. Further, in order to determine whether the zero substitution has already occurred, the zero substitution detection pulse may be stored in a shift register 35 (constructed of six stages) in advance, and it may be checked. Accordingly, the logical sum between the outputs of the shift register 35 and the seventh stage 27-7 of the shift register 27 is obtained by means of an OR gate 33. The output of the OR gate 33 shall be called the "preceding state acknowledgement signal".

Thus, the AND gate 32 detects when the in-phase pulse and antiphase pulse detection signals are "1" and when the preceding state acknowledgement signal is also "1". When the result is "1", the zero substitution is positively identified. At this time at which the output of the AND gate 32 is "1", the violation is removed by resetting the first to sixth stages of the flip-flops of the shift registers 27 and 28 through an OR gate 34. Accordingly, a regenerated signal restored to the original information "0's" is delivered from each of the output terminals 39 and 40.

In FIG. 6, a NOR gate 36, an AND gate 37 and an OR gate 38 form an arrangement for the case where the signal of the violation is "$\emptyset_-$, $\emptyset_-$, −1, +1, $\emptyset_+$, $\emptyset_+$". Since these circuit elements operate to remove the violation by quite similar operations to the foregoing, a detailed description of the respective parts shall be omitted.

Figure 7:
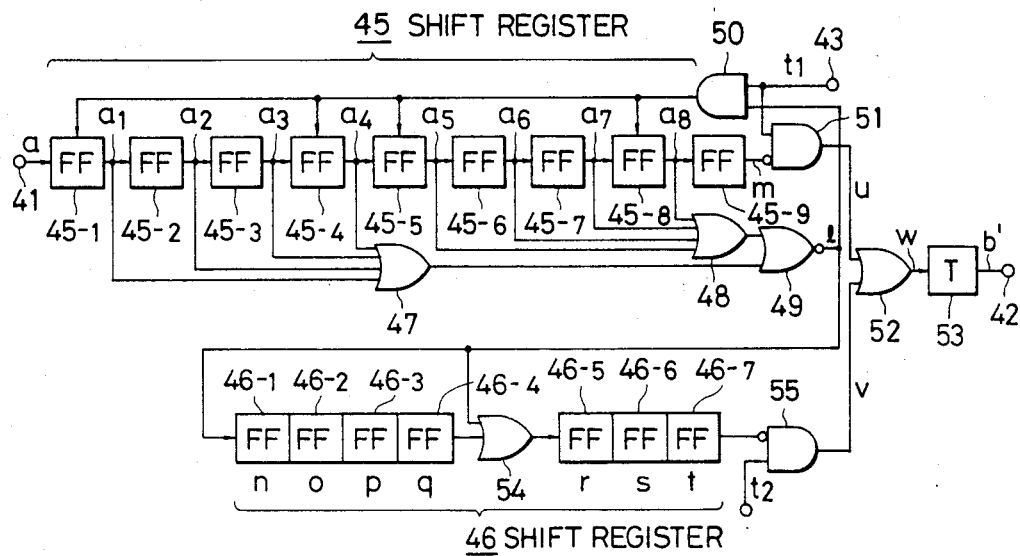
Figure 8:
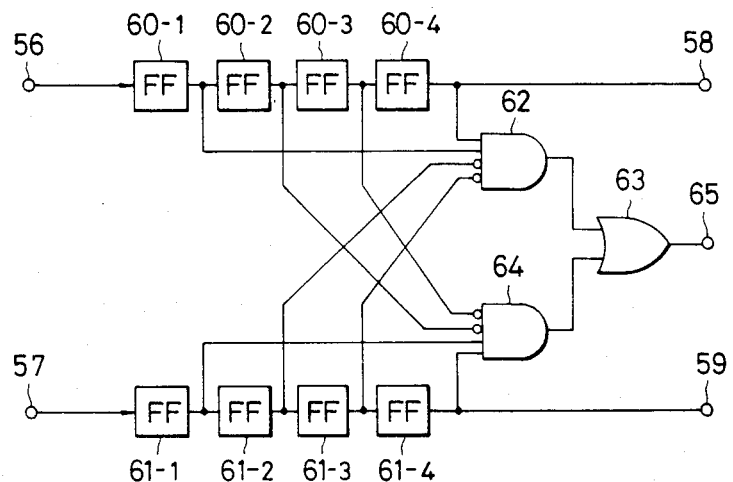

FIGS. 7 and 8 show circuit diagrams of other embodiments of the code converter 3 in the transmitting circuit portion and the zero substitution eliminating circuit 9 in the receiving circuit portion in another embodiment of the code transmission system according to the present invention.

When, in the case of a very long succession of "0's" in the original information, a code error has developed even in one in-phase pulse in the course of the occurrence of several zero substitutions, the zero substitution fails to be detected as such, and the zero substitution detection signal is not supplied for the ensuing zero substitution detection. Therefore, all the zero substitution detection operations fail subsequent to this point of time. That is, a propagation of the code error takes place. The embodiment illustrates in FIGS. 7 and 8 prevents such propagation of the code error. Before the explanation of the embodiment, the principle of operation thereof will be described with reference to FIG. 9.

There will be mentioned an example wherein a "0" succession part of 8 bits is subjected to zero substitution when "0's" succeed each other for a long period in the original information. The zero substitution is performed so that the first, fourth, fifth and eighth bits may become in-phase pulses and the anti-phase pulses may arise between the second and third bits and between the sixth and seventh bits. The corresponding received signal becomes as shown at e due to the band limitation of the transmission line. When such a signal is discriminated and regenerated, a signal f is obtained.

Figure 9:
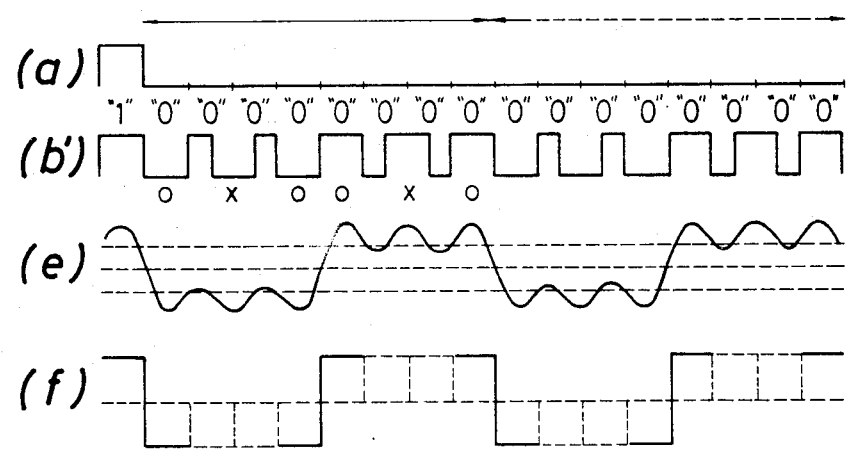

As understood from FIG. 9, even when all undefined pulses indicated by dotted lines have become zero, there arises a signal which differs from a duo-binary shaped signal in the case where the AMI signal is normal within the zero substitution portion. More specifically, in the normal duo-binary shaped signal, the values "+1" and "−1" arise alternately without fail. In contrast, in the regenerated signal resulting from the zero substitution operation, the values "+1" and "−1" do not alternately arise irrespective of the values of the undefined pulses. When this property is utilized, the preceding state acknowledgement signal is dispensed with. That is, since the violation conforming with the AMI rules is contained within one section of the zero substitution, the zero substitution can be detected without checking the preceding state.

Figure 10:
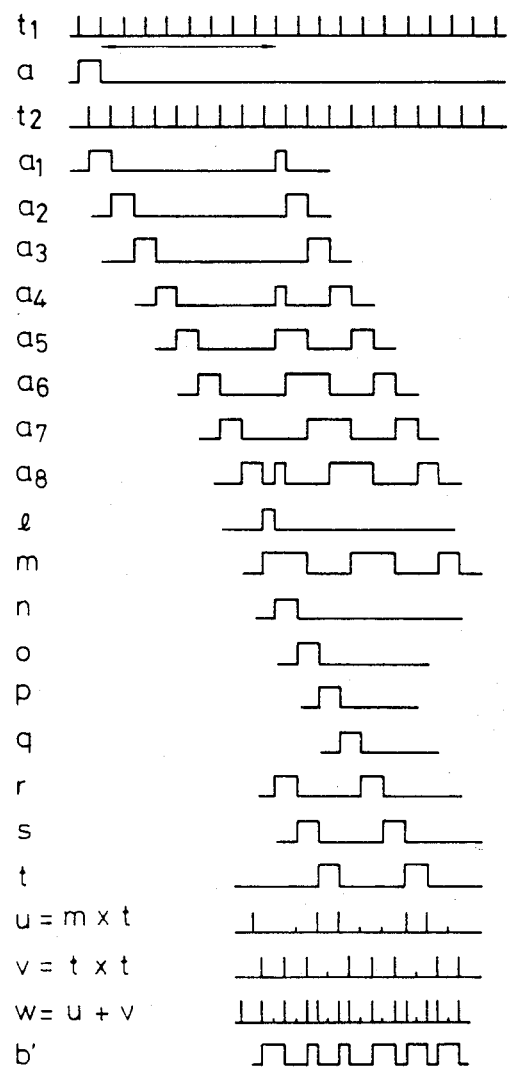

The arrangement and operation of the embodiment in FIG. 7 will be described with reference to a time chart in FIG. 10. The original information signal a (the same as that shown at a in FIG. 9) is applied to the input terminal 41 of a shift register 45, which has nine stages of flip-flops (45-1 to 45-9) connected in series, the input signal a being applied in synchronism with a timing signal $t_2$ having a period T. With the lapse of time, the outputs of the respective stages of the shift register 45 become as shown at $a_1$–$a_8$ in FIG. 10. The OR gates 47, 48 and a NOR gate 49 are used for detecting the succession of eight "0's" which are the outputs of the respective stages, which condition produces the output pulse (l). When, after the provision of this signal l, a clock $t_1$ having a period T and delayed by T/2 with respect to the clock $t_2$ has arrived at an input terminal 43, it sets the first, fourth, fifth and eighth stages of the shift register 45 through an AND gate 50. At the same time, l="1" is applied to the first stage 46-1 and fifth stage 46-5 of a shift register 46, through an OR gate 54. The outputs of the respective stages of the shift register 46 become as shown at n, o, p, q, r, s and t in FIG. 10.

The clock $t_1$ impressed on an AND gate 51 is inhibited by the output m of the ninth stage 45-9 of the shift register 45, and a train of pulses u results. The clock $t_2$ impressed on an AND gate 55 is inhibited by the output t of the seventh stage 46-7 of the shift register 46, and a train of pulses v results. Thus, an OR gate 52 takes the logical sum between the pulse trains u and v and provides a train of pulses w, with which a T-type flip-flop 53 is triggered. Then, the pulses b' (the same as those pulses b' in FIG. 9) resulting from the zero substitution of the two-level AMI signal are obtained.

FIG. 8 shows the arrangement of one embodiment of the circuit for detecting and removing the zero substitution portion from the two-level AMI signal which has been obtained by the embodiment of FIG. 7. The decision circuit 7 in FIG. 1 converts the signal of the three levels "+1", "0" and "−1", which is the duo-binary shaped signal (e) or (f) in FIG. 9, into a first train of pulses (P pulse train) wherein the pulse "+1" is made "1" and the others ("0" and "−1") are made "0", and a second train of pulses (N pulse train) wherein only the pulse "−1" is made "1" and the others ("0" and "+1") are made "0". Then, it applies the P pulse train and the N pulse train to input terminals 56 and 57 in FIG. 8, respectively.

When the zero substitution process as shown at (b') in FIG. 9 has been applied to the signal in the transmitting circuit portion as described, the P and N pulses of the signal e become "0 0 0 0 1 $\emptyset_+$ $\emptyset_{30}$ 1" and "1 $\emptyset_-$ $\emptyset_-$ 1 0 0 0 0", respectively. Thus, an AND gate 62 receives the outputs of the first and fourth stages 60-1, 60-4 of a shift register 60 and the inverted signals of the outputs of the second and third stages 61-2, 61-3 of a shift register 61, and an AND gate 64 receives the inverted signals of the outputs of the second and third stages 60-2, 60-3 of the shift register 60 and the outputs of the first and fourth stages 61-1, 61-4 of the shift register 61. The outputs of the respective AND gates are applied to an OR gate 63. Then, only when the zero substitution condition is detected, a pulse is provided from an output terminal 65. When, upon the provision of this output, the respective stages of the shift registers 60 and 61 are reset, outputs restored to the succession of "0's" of the original information are provided from output terminals 58 and 59. In this manner, the zero substitution removal is effected in a 4-bit unit on the receiving side. In the duo-binary shaped signal of the normal two-level AMI signal which has not been subjected to the zero substitution, "−1" arises between "1" and "1" necessarily. Therefore, "1" is not provided from the OR gate 65 in FIG. 8.

As described above in connection with the preferred embodiments, according to the present invention, the execution of zero substitution is permitted in the case of performing the duo-binary shaping of a two-level AMI signal. Even when "0's" succeed each other in the original information, the extraction of a timing signal and the AGC operation are facilitated, and besides, a zero substitution part of the case of executing the zero substitution including violation can be properly detected.

In the foregoing description and the appended claims, reference is made to detection of and substitution for a predetermined number of successive "0's" in the binary information signal; however, in the case where a succession of "1's" in the binary information signal results in a "0" level in the duo-binary signal and consequent inability to extract a clock signal at the receiving end, the invention contemplates the detection and substitution of a recognizable signal portion for such succession of "1's" in a similar and equivalent manner to that already desccribed.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A code signal transmission system comprising a transmitting circuit portion and a receiving circuit portion interconnected by a transmission line; said transmitting circuit portion including code converter means for converting a binary information signal of "1" and "0" levels into a coded pulse signal in which one code has its polarity inverted at a first fixed period T and the other code has its polarity inverted at a second fixed period of one-half T, zero succession detection means for detecting a predetermined number of successive "0's" in said binary information signal, and zero substitution means responsive to said zero succession detection means for controlling said code converter means to replace said succession of "0's" with a recognizable signal portion formed by a pulse train including two-level codes of level "1" in-phase with or anti-phase to the "0" values of said binary information signal; and said receiving circuit portion including means connected to receive a coded signal from said transmission line for subjecting said coded signal to duo-binary shaping to produce a duo-binary shaped signal of the three levels "+1", "0" and "−1", regenerating means for regenerating a binary information signal from said duo-binary shaped signal, zero substitution detection means for detecting said recognizable signal portion from the in-phase or anti-phase pulse arrangement of said duo-binary shaped signal, zero substitution elimination means responsive to said zero substitution detection means for converting said recognizable signal portion to a succession of "0's", and clock detector means responsive to said duo-binary shaped signal for generating a clock signal to control said regenerating means.

2. A code signal transmission system according to claim 1, wherein said zero substitution means includes means for producing a recognizable signal portion in which the number of in-phase pulses is equal to or larger than the number of anti-phase pulses, and in which, when the in-phase and anti-phase pulses are equal, the number of the in-phase pulse adjacent to each other is larger than the number of anti-phase pulses adjacent to each other.

3. A code signal transmission system according to claim 1, wherein said zero succession detection means includes means for detecting six "0's" in succession.

4. A code signal transmission system according to claim 1, wherein said zero substitution means includes first shift register means connected to receive said binary information signal and having a number of stages at least equal to said predetermined number which are clocked by a first clock signal for producing said in-phase pulses for said recognizable signal portion, and means responsive to said zero succession detection means for resetting selected stages of said first shift register.

5. A code signal transmission system according to claim 4, wherein said zero substitution means further includes second shift register means responsive to said zero succession detection means and clocked by a second clock signal for producing said anti-phase pulses for said recognizable signal portion, and means for producing the logical sum of the outputs of said first and second shift register means.

6. A code signal transmission system according to claim 5, wherein said zero succession detection means includes means for detecting the state of said predetermined number of successive stages in said first shift register means.

7. A code signal transmission system according to claim 5, wherein said first shift register means has six stages, and said resetting means is connected to reset the third and fourth stages of said first shift register means.

8. A code signal transmission system according to claim 7, wherein said second shift register means includes five stages with the output of said zero succession detection means being applied to the input of the first and fifth stages thereof.

9. A code signal transmission system according to claim 5, wherein said first shift register means has nine stages, and said resetting means is connected to reset the first, fourth, fifth and eighth stages of said first shift register means.

10. A code signal transmission system according to claim 9, wherein said second shift register means includes seven stages with the output of said zero succession detection means being applied to the input of said first and fifth stages thereof.

11. A code signal transmission system according to claim 1, wherein said receiving circuit portion further comprises a decision circuit connected to receive said duo-binary shaped signal including first means for converting the signal values "+1" of said duo-binary shaped signal into "1" and signal values "0" and "−1" thereof into "0", second means for converting the signal values "−1" of said duo-binary shaped signal into "1" and signal values "+1" thereof onto "0", and means for applying the outputs of said first and second means as first and second outputs of said decision circuit to said zero substitution elimination means.

12. A code signal transmission system according to claim 11, wherein said zero substitution elimination means includes first shift register means connected to receive said first output of said decision circuit and second shift register means connected to receive said second output of said decision circuit, and said zero substitution detection means includes means connected to selected stages of said first and second shift register means for resetting at least one of said first and second shift register means upon detection of said recognizable signal portion.

13. A code signal transmission system according to claim 12, wherein said first and second shift register means each comprise seven stages and said zero substitution detection means includes a NOR gate connected to receive the outputs of the fifth and sixth stages of said first shift register means and the outputs of said first and second stages of said second shift register means.

14. A code signal transmission system according to claim 13, wherein said zero substitution detection means includes an AND gate connected to receive the outputs of said third stage of said first shift register means, the fourth stage of said second shift register means and the output of said NOR gate, and means responsive to the output of said AND gate for resetting said first and second shift register means.

15. A code signal transmission system according to claim 12, wherein said first and second shift register means each comprise four stages, and said zero substitution detection means includes an AND gate having a pair of non-inverting inputs connected respectively to the outputs of the first and fourth stages of one of said first and second shift register means and a pair of inverting inputs connected respectively to the outputs of the second and third stages of the other of said first and second shift register means, and means for resetting said first and second shift register means in response to the output of said AND gate.

16. A transmitting circuit portion for a code signal transmission system, comprising code converter means for converting a binary information signal of "1" and "0" levels into a coded pulse signal in which one code has its polarity inverted at a first fixed period T and the other code has its polarity inverted at a second fixed period of one-half T, zero succession detection means for detecting a predetermined number of successive "0's" in said binary information signal, and zero substitution means responsive to said zero succession detection means for controlling said code converter means to replace said succession of "0's" with a recognizable signal portion formed by a pulse train including two-level codes of level "1" in-phase with or anti-phase to the "0" values of said binary information signal.

17. A code signal transmission system according to claim 16, wherein said zero substitution means includes means for producing a recognizable signal portion in which the number of in-phase pulses is equal to or larger than the number of anti-phase pulses, and in which, when the in-phase and anti-phase pulses are equal, the number of the in-phase pulses adjacent to each other is larger than the number of anti-phase pulses adjacent to each other.

18. A code signal transmission system according to claim 16, wherein said zero succession detection means includes means for detecting six "0's" in succession.

19. A code signal transmission system according to claim 16, wherein said zero substitution means includes first shift register means connected to receive said binary information signal and having a number of stages at least equal to said predetermined number which are clocked by a first clock signal for producing said in-phase pulses for said recognizable signal portion, and means responsive to said zero succession detection means for resetting selected stages of said first shift register.

20. A code signal transmission system according to claim 19, wherein said zero substitution means further includes second shift register means responsive to said zero succession detection means and clocked by a second clock signal for producing said anti-phase pulses for said recognizable signal portion, and means for producing the logical sum of the outputs of said first and second shift register means.

21. A code signal transmission system according to claim 20, wherein said zero succession detection means includes means for detecting the state of said predetermined number of successive stages of said first shift register means.

22. A code signal transmission system according to claim 20, wherein said first shift register means has six stages, and said resetting means is connected to reset the third and fourth stages of said first shift register means.

23. A code signal transmission system according to claim 22, wherein said second shift register means includes five stages with the output of said zero succession detection means being applied to the input of the first and fifth stages thereof.

24. A code signal transmission system according to claim 20, wherein said first shift register means has nine stages, and said resetting means is connected to reset the first, fourth, fifth and eighth stages of said first shift register means.

25. A code signal transmission system according to claim 24, wherein said second shift register means includes seven stages with the output of said zero succession detection means being applied to the input of said first and fifth stages thereof.

26. For use in a code signal transmission system in which a transmission line carries a coded pulse signal, a recognizable signal portion of which represents a succession of a predetermined number of "0's" in a binary information signal from which the coded pulse signal is derived by conversion, the recognizable signal portion being formed by a pulse train including two-level codes of level "1" in-phase with or anti-phase to the "0" values of said binary information signal, a receiving circuit comprising means connected to receive a coded signal from said transmission line for subjecting said coded signal to duo-binary shaping to produce a duo-binary shaped signal of the three levels "+1", "0" and "−1", regenerating means for regenerating a binary information signal from said duo-binary shaped signal, zero substitution detection means for detecting said recognizable signal portion from the in-phase or anti-phase pulse arrangement of said duo-binary shaped signal, zero substitution elimination means responsive to said zero substitution detection means for converting said recognizable signal portion to a succession of "0's ", and clock detector means responsive to said duo-binary shaped signal for generating a clock signal to control said regenerating means.

27. A code signal transmission system according to claim 26, wherein said receiving circuit portion further comprises a decision circuit connected to receive said duo-binary shaped signal including first means for converting the signal values "+1" of said duo-binary shaped signal into "1" and signal values "0" and "−1" thereof into "0", second means for converting the signal values "−1" of said duo-binary shaped signal into "1" and signal values "+1" and "0" thereof into "0", and means for applying the outputs of said first and second means as first and second outputs of said decision circuit to said zero substitution elimination means.

28. A code signal transmission system according to claim 27, wherein said zero substitution elimination means includes first shift register means connected to receive said first output of said decision circuit and second shift register means connected to receive said second output of said decision circuit, and said zero substitution detection means includes means connected to selected stages of said first and second shift register means for resetting at least one of said first and second shift register means upon detection of said recognizable signal portion.

29. A code signal transmission system according to claim 28, wherein said first and second shift register means each comprise seven stages and said zero substitution detection means includes a NOR gate connected to receive the outputs of the fifth and sixth stages of said first shift register means and the outputs of said first and second stages of said second shift register means.

30. A code signal transmission system according to claim 29, wherein said zero substitution detection means includes an AND gate connected to receive the outputs of said third stage of said first shift register means, the fourth stage of said second shift register means and the output of said NOR gate, and means responsive to the output of said AND gate for resetting said first and second shift register means.

31. A code signal transmission system according to claim 28, wherein said first and second shift register means each comprise four stages, and said zero substitution detection means includes an AND gate having a pair of non-inverting inputs connected respectively to the outputs of the first and fourth stages of one of said first and second shift register means and a pair of inverting inputs connected respectively to the outputs of the second and third stages of the other of said first and second shift register means, and means for resetting said first and second shift register means in response to the output of said AND gate.

* * * * *